(12) United States Patent
Newman

(10) Patent No.: US 8,873,405 B2
(45) Date of Patent: Oct. 28, 2014

(54) AUTOMATED SESSION INITIATION PROTOCOL (SIP) DEVICE

(75) Inventor: Craig E. Newman, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2197 days.

(21) Appl. No.: 11/611,582

(22) Filed: Dec. 15, 2006

(65) Prior Publication Data

US 2008/0144606 A1 Jun. 19, 2008

(51) Int. Cl.
*H04J 3/14* (2006.01)
*H04L 12/26* (2006.01)
*H04M 1/24* (2006.01)
*H04M 3/42* (2006.01)
*G06F 11/00* (2006.01)
*G06F 15/16* (2006.01)
*H04M 3/24* (2006.01)
*H04L 29/06* (2006.01)

(52) U.S. Cl.
CPC ........ *H04L 65/1006* (2013.01); *H04L 12/2697* (2013.01); *H04L 65/1059* (2013.01); *H04M 3/241* (2013.01); *H04L 43/50* (2013.01)
USPC ...... 370/250; 370/271; 370/352; 370/395.52; 379/10.01; 379/27.04; 379/88.17; 379/207.02; 379/418; 709/203; 709/224; 709/227

(58) Field of Classification Search
USPC ......... 370/242, 248, 249, 356, 401, 352, 250, 370/271, 395.52; 714/712, 716, 717; 379/10.01, 27.04, 88.17, 207.02, 418; 709/203, 224, 227
See application file for complete search history.

(56) References Cited

U.S. PATENT DOCUMENTS

| | | | |
|---|---|---|---|
| 6,856,618 B2 * | 2/2005 | Strathmeyer et al. ......... 370/356 |
| 6,876,633 B2 * | 4/2005 | Strathmeyer et al. ......... 370/260 |
| 6,940,847 B1 * | 9/2005 | Glitho et al. ................. 370/352 |
| 7,154,863 B2 * | 12/2006 | Strathmeyer et al. ......... 370/260 |
| 7,257,201 B2 * | 8/2007 | Singh et al. ................. 379/88.13 |
| 7,411,917 B1 * | 8/2008 | Hardie et al. ................. 370/252 |
| 7,751,536 B1 * | 7/2010 | Abramson et al. ......... 379/88.17 |
| 7,830,868 B2 * | 11/2010 | Buckley ....................... 370/353 |
| 7,899,168 B2 * | 3/2011 | Raghav et al. ........... 379/201.01 |
| 7,965,828 B2 * | 6/2011 | Calahan et al. .......... 379/201.01 |
| 8,139,741 B1 * | 3/2012 | Calahan et al. .......... 379/201.01 |
| 8,155,294 B2 * | 4/2012 | Raghav et al. ........... 379/201.01 |
| 8,199,886 B2 * | 6/2012 | Calahan et al. ................. 379/85 |
| 8,315,245 B2 * | 11/2012 | Savoor et al. ................. 370/352 |
| 8,380,840 B2 * | 2/2013 | Vijay ........................... 709/224 |
| 2002/0103898 A1 * | 8/2002 | Moyer et al. ................. 709/224 |
| 2005/0289222 A1 * | 12/2005 | Sahim ........................... 709/206 |
| 2006/0239300 A1 * | 10/2006 | Hannel et al. ................. 370/503 |
| 2007/0019559 A1 * | 1/2007 | Pittelli et al. ................. 370/248 |
| 2007/0064886 A1 * | 3/2007 | Chiu et al. ................. 379/88.17 |
| 2007/0124813 A1 * | 5/2007 | Ormazabal et al. ............. 726/11 |
| 2007/0286351 A1 * | 12/2007 | Ethier et al. ............. 379/32.01 |
| 2008/0031143 A1 * | 2/2008 | Ostrosky ....................... 370/242 |
| 2008/0080481 A1 * | 4/2008 | Calahan et al. ............... 370/352 |
| 2009/0313376 A1 * | 12/2009 | Cedervall et al. ............. 709/227 |

* cited by examiner

*Primary Examiner* — Alpus H Hsu

(57) ABSTRACT

A device includes a Session Initiation Protocol (SIP) phone, an audio interface for receiving or transmitting audio information with the SIP phone to test a SIP-based network, and a controller for controlling the SIP phone and the audio interface.

23 Claims, 8 Drawing Sheets

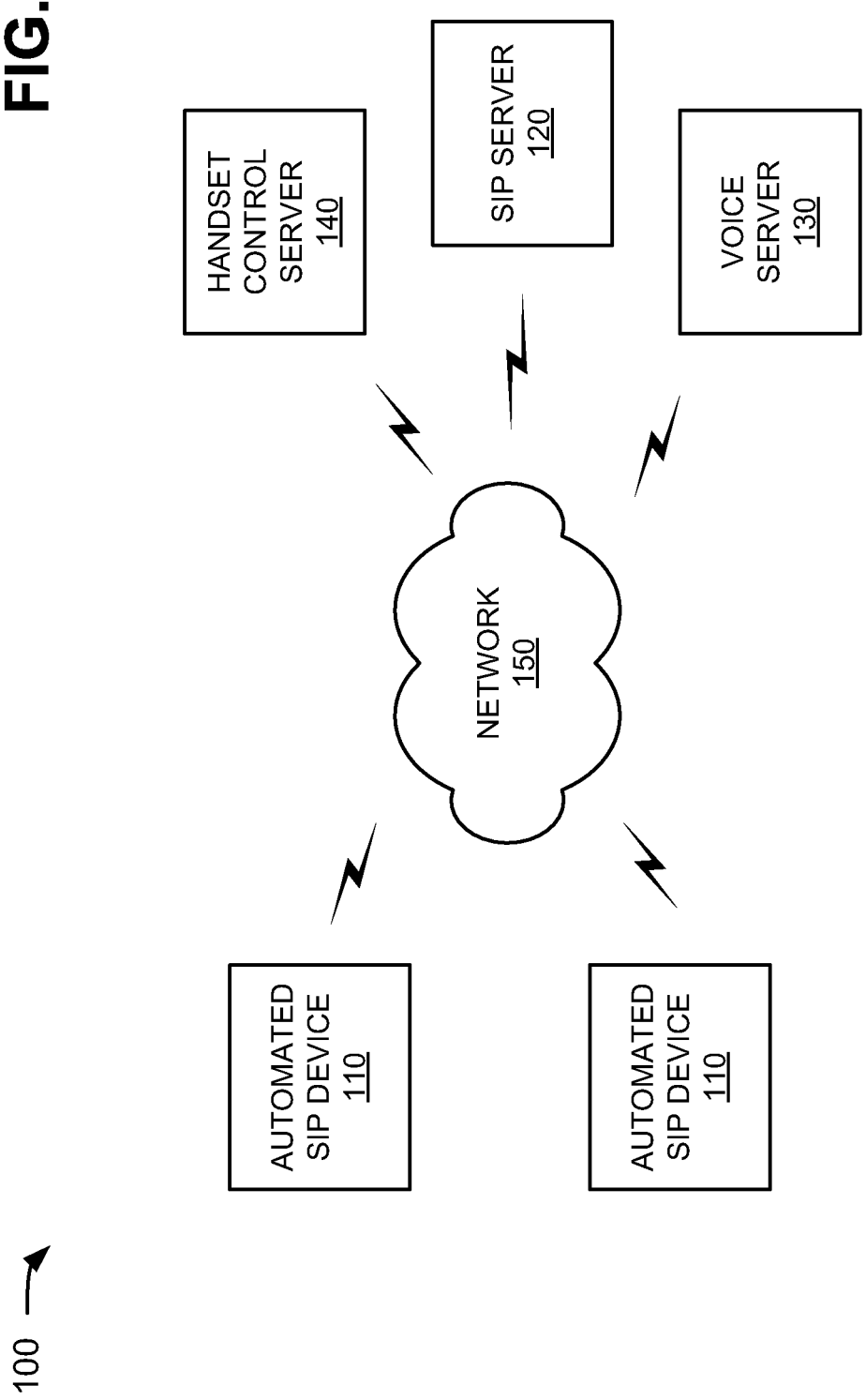

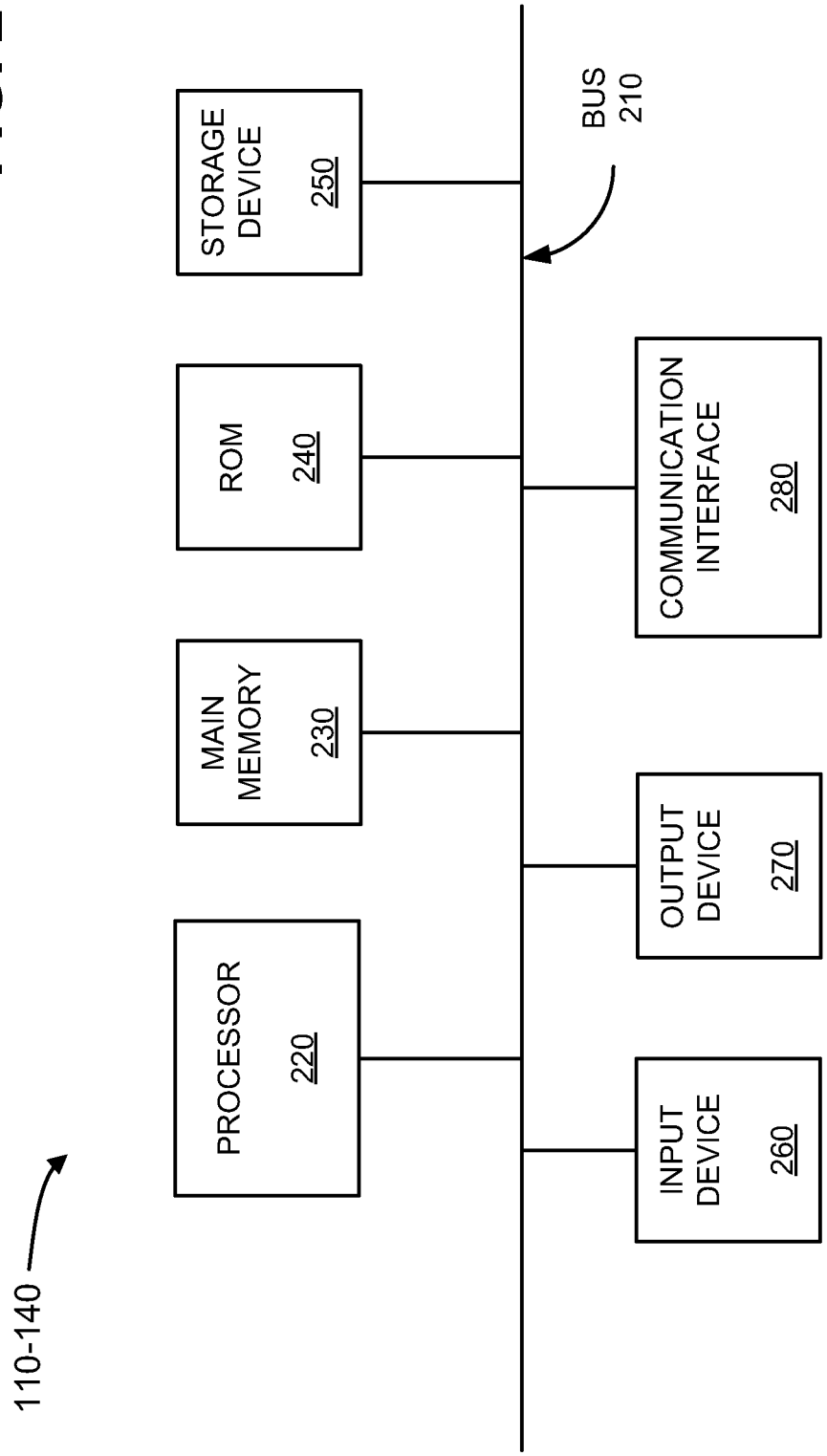

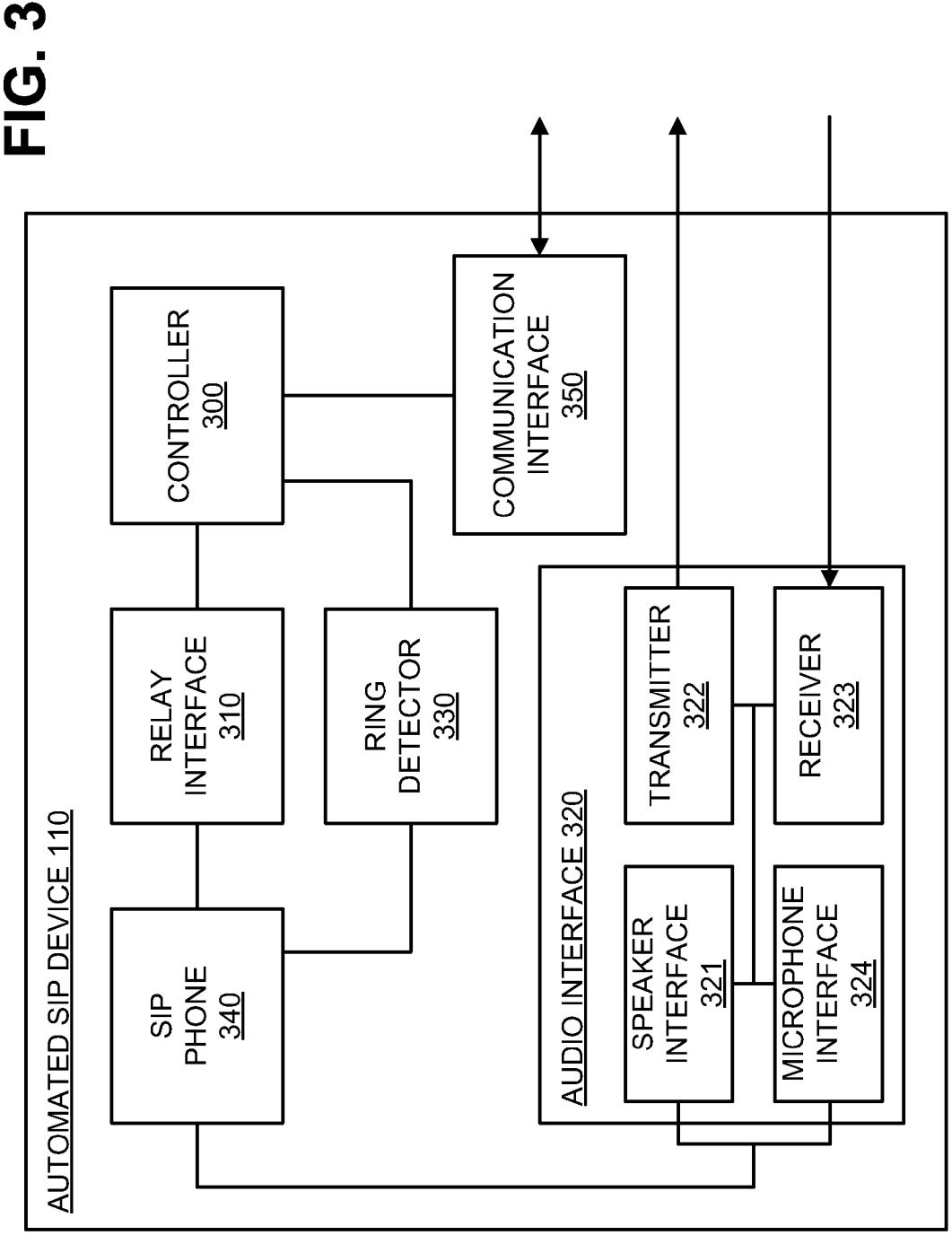

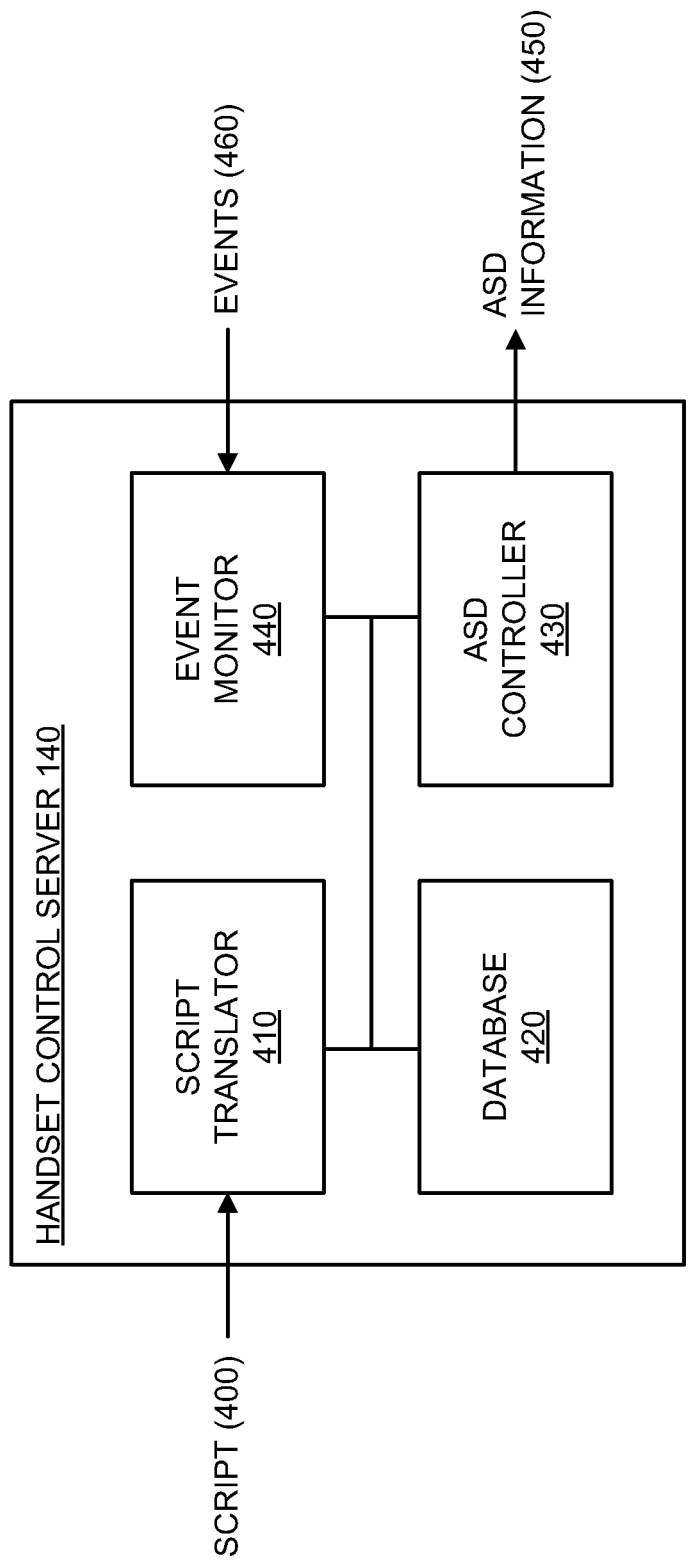

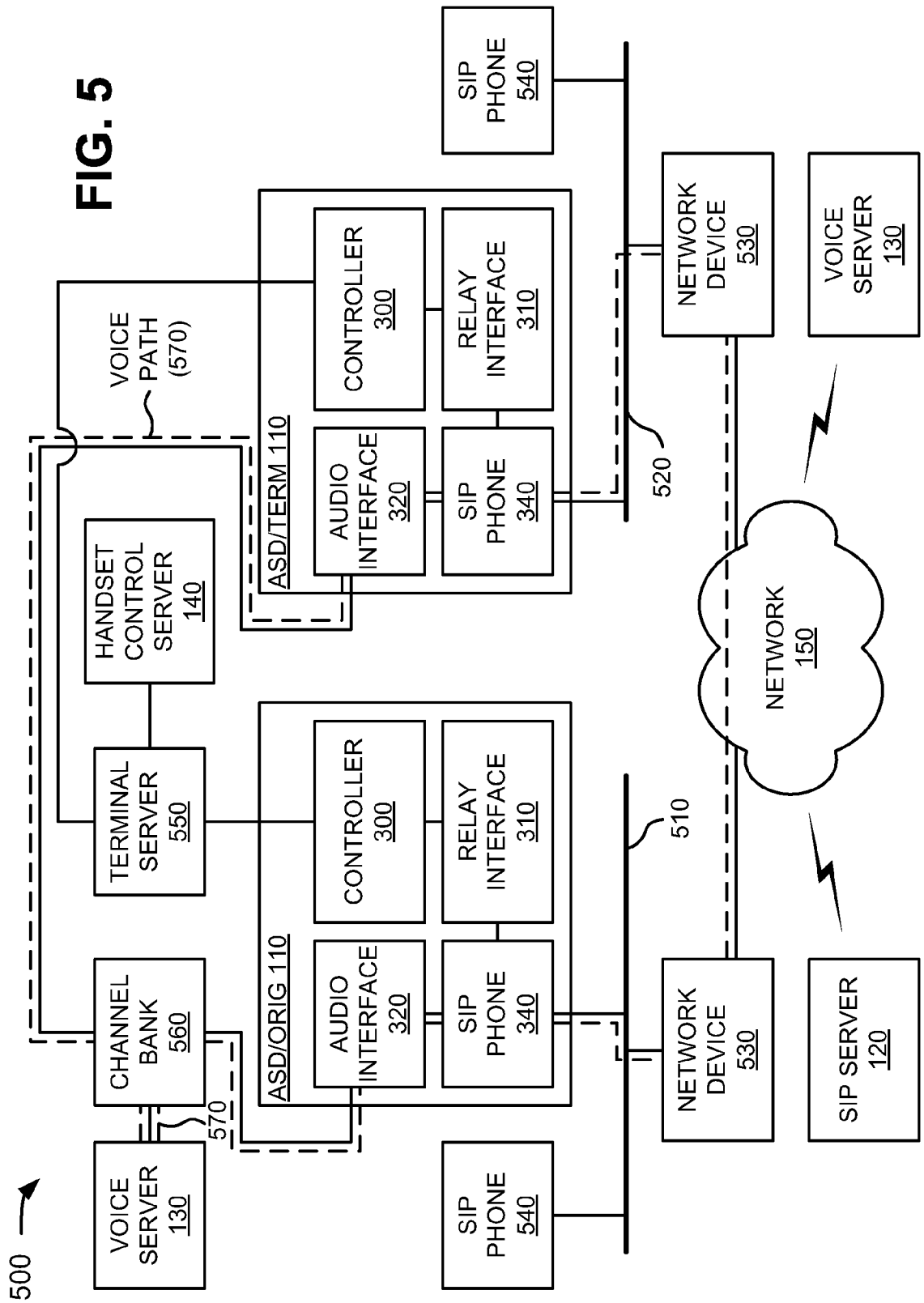

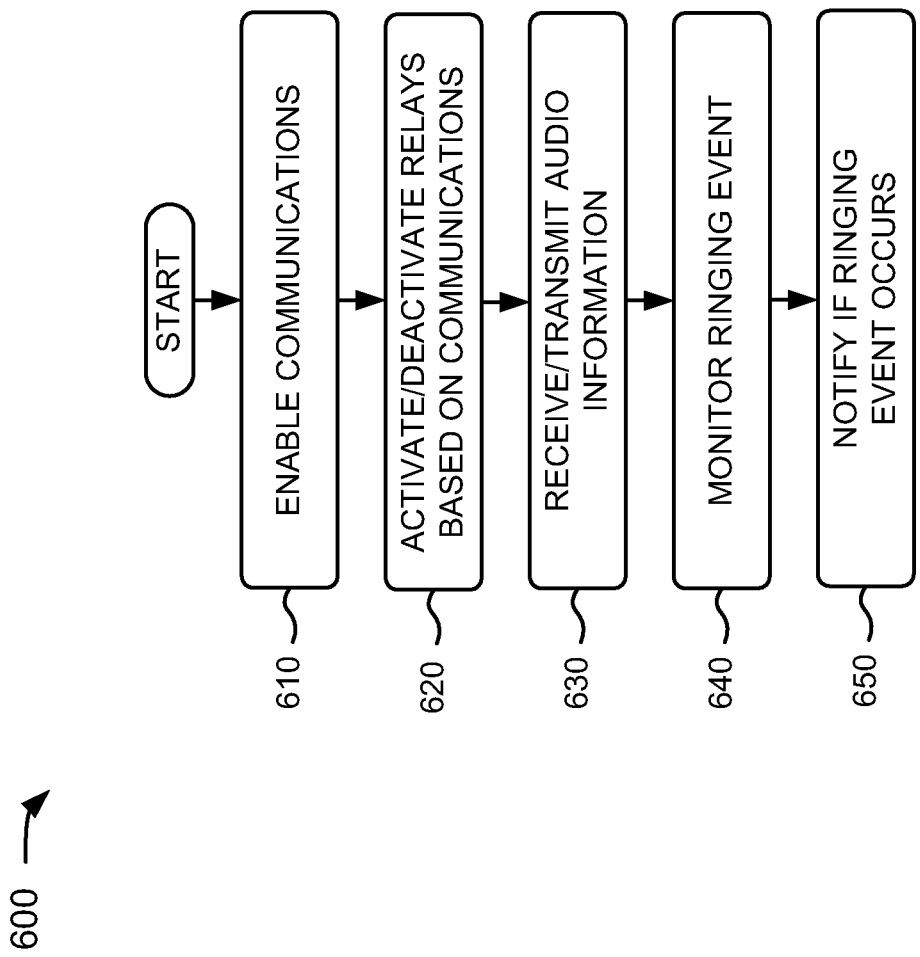

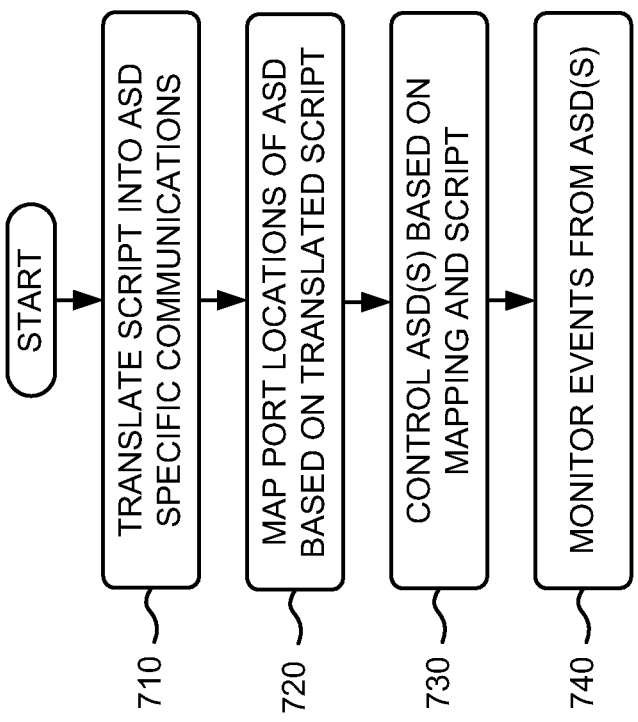

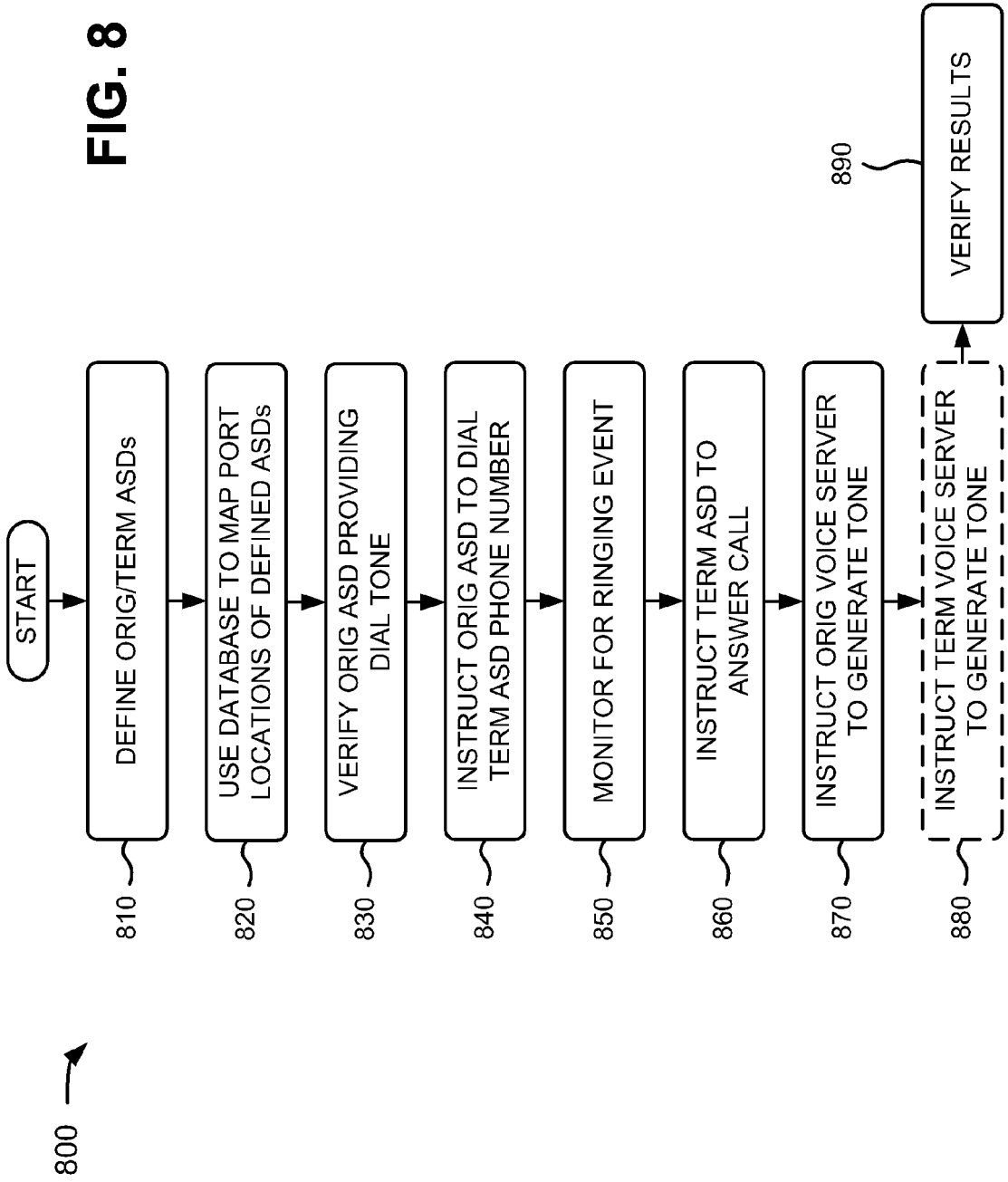

AUTOMATED SESSION INITIATION PROTOCOL (SIP) DEVICE

BACKGROUND INFORMATION

Session Initiation Protocol (SIP) is an application-layer control (i.e., signaling) protocol for creating, modifying, and terminating sessions with one or more users. These sessions may include Internet-based telephone calls, multimedia distribution, multimedia conferences, instant messaging conferences, interactive voice response (IVR), automated and manual operator services, automatic call distribution, call routing, etc. SIP invitations or SIP INVITE requests may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Testing of SIP-based systems typically is a manual and time consuming task. For example, a SIP device (e.g., a SIP telephone) may be a computer-based device that participates in call processing within a SIP-based network. Unlike conventional telephones which may be emulated during testing of network functions, SIP telephones fail to provide such emulation.

BRIEF DESCRIPTION OF THE DRAWINGS

FIG. 1 depicts an exemplary network in which systems and methods described herein may be implemented;

FIG. 2 depicts an exemplary device, client or server, configured to communicate via the exemplary network of FIG. 1;

FIG. 3 is an exemplary functional diagram of an automated SIP device of the exemplary network shown in FIG. 1;

FIG. 4 is an exemplary functional diagram of a handset control server of the exemplary network shown in FIG. 1;

FIG. 5 depicts another exemplary network in which systems and methods described herein may be implemented;

FIG. 6 is a flowchart of an exemplary process capable of being performed by the automated SIP device shown in FIG. 3; and FIGS. 7 and 8 are flowcharts of exemplary processes capable of being performed by the handset control server shown in FIG. 4.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and methods that use an automated SIP device (ASD) to permit functional testing of a SIP-based network and/or devices within the SIP-based network with minimal manual input. The systems and methods may implement the ASD within an interactive testing platform (ITP) system that may test the performance of the SIP-based network. The ITP system may include a handset control server that may provide specific control of the ASD and may enable ASD to be used in the larger ITP system.

FIG. 1 is a diagram of an exemplary network 100 in which systems and methods described herein may be implemented. Network 100 may include automated SIP devices (ASDs) 110 connected to multiple servers (e.g., a SIP server 120, a voice server 130, and a handset control server 140) via a network 150. Network 150 may include a local area network (LAN), a wide area network (WAN), a telephone network, such as the Public Switched Telephone Network (PSTN), an intranet, the Internet, or a combination of networks.

ASDs 110 and servers 120-140 may connect to network 150 via wired, wireless, and/or optical connections. Two ASDs 110 and three servers 120-140 have been illustrated as connected to network 150 for simplicity. In practice, there may be more or fewer ASDs and servers. Also, in some instances, an ASD may perform one or more functions of a server and/or a server may perform one or more functions of an ASD.

ASDs 110 may include a device, such as a personal computer, a SIP telephone, a wireless telephone, a personal digital assistant (PDA), a laptop, or another type of computation or communication device, a thread or process running on one of these devices, and/or an object executable by one of these devices. Additional details of ASDs 110 are provided below in connection with FIG. 3.

SIP server 120, also commonly referred to as a network server, may include a device that facilitates the establishment of SIP calls. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.). SIP server 120 may act as both a server and a client for the purpose of making requests on behalf of other clients. Requests may be serviced internally or by passing them on, possibly after translation, to other servers. SIP server 120 may interpret, and, if necessary, rewrite a request message before forwarding it.

Voice server 130 may include server entities that are capable of facilitating SIP-based communications, e.g., Internet-based telephone calls, multimedia distribution, multimedia conferences, instant messaging conferences, interactive voice response (IVR), automated and manual operator services, automatic call distribution, call routing, etc. Voice server 130 may include T1, E1, and/or International Telecommunication Union (ITU) Signaling System 7 (SS7) interface cards that may facilitate in-band, Primary Rate Interface (PRI), and/or SS7 signaling methods.

Handset control server 140 may include server entities that may provide control of ASDs 110 and may enable ASDs 110 to be implemented in an ITP system. For example, handset control server 140 may enable ASDs 110 to be named in a human readable format, may map physical port locations of ASDs 110 for communications, may translate testing script commands (e.g., provided by the ITP system) into specific communications provided by ASDs 110, etc. Additional details of handset control server 140 are provided below in connection with FIG. 4.

Although FIG. 1 shows exemplary components of network 100, in other implementations, network 100 may contain fewer or additional components that may permit network testing. In still other implementations, one or more components of network 100 may perform the tasks performed by other components of network 100. In one implementation, for example, network 100 may include the features set forth in co-pending application Ser. No. 11/611,529, entitled "AUTOMATED TELETYPE (TTY) TESTING," filed on the same date herewith, the disclosure of which is incorporated by reference herein in its entirety.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Although implementations are described below in the context of SIP and an Internet Protocol (IP)-based network, in other implementations equivalent or analogous communication protocols (e.g., ITU H.323, ITU SS7, integrated services digital network (ISDN), in-band, etc.) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as ASDs 110, connected to a network. Although SIP-type messages are shown for convenience, any type of protocol or a mixture of such protocols may be applied in various parts of the overall system.

FIG. 2 is an exemplary diagram of a client or server entity (hereinafter called "client/server entity"), which may correspond to one or more of ASDs 110 and servers 120-140. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity may perform certain operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer or additional components. In still other implementations, one or more components of the client/server entity may perform the tasks performed by other components of the client/server entity.

FIG. 3 is an exemplary functional diagram of a single ASD 110 of exemplary network 100. As shown, ASD 110 may include a variety of components, including, e.g., a controller 300, a relay interface 310, an audio interface 320, a ring detector 330, a SIP telephone or SIP phone 340, a communication interface 350, etc. Controller 300 may correspond to processor 220 and may perform functions similar to the functions performed by processor 220. For example, controller 300 may enable communications for ASD 110 (e.g., via communication interface 350), may activate and/or deactivate relays of relay interface 310 per instructions received by ASD 110, may monitor ring detector 330 for ringing events, call waiting events, message waiting indicator events, etc.

Relay interface 310 may be controlled by controller 300 and may be connected to a number keypad, function keys, a hook switch, and/or a power supply of SIP phone 340. Relay interface 310 may perform a variety of tasks. For example, relay interface 310 may include a series of relays that may be activated and/or deactivated based on instructions received by, e.g., controller 300, may disconnect SIP phone 340 (i.e., take SIP phone 340 off the hook), may dial telephone numbers of varying lengths via SIP phone 340 (e.g., emulating human action), press function keys, etc. In other implementations, an on/off duration of relay interface 310 may be controlled to specify, e.g., a duration of a dual-tone multifrequency (DTMF) digit. In still other implementations, relay interface 310 may control the power supplied to SIP phone 340 in order to reset SIP phone 340 and to cause SIP phone 340 to receive new configuration information.

Audio interface 320 may replace a handset of SIP phone 340 and may provide electrical conversion of information (e.g., audio information) received and/or transmitted by SIP phone 340. For example, in one implementation, audio interface 320 may include a speaker interface 321 that receives audio information from SIP phone 340, and may further include a transmitter 322 that converts the audio information from speaker interface 321 into electrical signals (e.g., representative of the audio information) and outputs the electrical signals for measurement or testing. In another implementation, audio interface 320 may include a receiver 323 that receives electrical signals representative of audio information, and may further include a microphone interface 324 that converts the electrical signals from receiver 323 into audio information, and outputs the audio information via SIP phone 340. Audio interface 320 may permit adjustment of outputs by transmitter 322 and receiver 323.

Although FIG. 3 shows audio interface 320 replacing the handset of SIP phone 340, in other implementations, for example, the handset of SIP phone 340 may perform the functions of audio interface 320. In other implementations, speaker interface 321 may be combined with transmitter 322 into a single transmitter entity, and microphone interface 324 may be combined with receiver 323 into a single receiver entity.

Ring detector 330 may monitor a ringing event for SIP phone 340. If a ringing event occurs for SIP phone 340, ring detector 330 may provide this information to controller 300 and controller 300 may notify devices external to ASD 110, via communication interface 350, of the ringing event. Ring detector 330 may connect to a speaker provided within SIP phone 340 or audio interface 320, and may monitor the audible ringing provided by the speaker of SIP phone 340 or audio interface 320 for a predetermined ring frequency. Ring detector 330 may permit adjustment of the predetermined ring frequency. Similar functions may be performed to monitor for call waiting and/or message waiting indicator events. For example, a light-emitting diode (not shown) may be monitored for the presence of energy to determine if a message waiting indicator event has occurred.

SIP phone 340 may include a device capable of providing SIP-based communications, such as a telephone, a wireless telephone, a personal digital assistant (PDA), or another type of computation or communication device, a thread or process running on one of these devices, and/or an object executable by one of these devices. As described above, SIP phone 340 may include a number keypad, function keys, a hook switch, a power supply, a speaker, and/or a microphone.

Communication interface 350 may correspond to communication interface 280 and may perform functions similar to the functions performed by communication interface 280. For example, communication interface 350 may include any transceiver-like mechanism that enables ASD 110 to communicate with another device or system via a network, such as network 150.

Although FIG. 3 shows exemplary components of ASD 110, in other implementations ASD 110 may contain fewer or additional components that may permit automated testing by ASD 110. In still other implementations, one or more components of ASD 110 may perform the tasks performed by other components of ASD 110.

An ITP system may include several servers that may interoperate in the execution of testing a SIP-based system (e.g., a script server that may create script, a script execution server that may execute script, voice server 140, etc.). In one implementation, for example, the ITP system may include the features set forth in co-pending application Ser. No. 11/611,605, entitled "AUTOMATED AUDIO STREAM TESTING," filed on the same date herewith, the disclosure of which is incorporated by reference herein in its entirety. In another implementation, the ITP system may include the features set forth in co-pending application Ser. No. 11/611,560, entitled "DISTRIBUTED VOICE QUALITY TESTING," filed on the same date herewith, the disclosure of which is incorporated by reference herein in its entirety.

FIG. 4 is an exemplary functional diagram of one such server of the ITP system, i.e., handset control server 140 of exemplary network 100. Generally, handset control server 140 may control ASDs 110, may enable ASDs 110 to be used in the ITP system, may enable ASDs 110 to be named in a human readable format, may map IP address and port locations of ASDs 110, and/or may translate script commands (e.g., Visual Basic style script commands) into ASD 110 specific communications. As shown, handset control server 140 may include a variety of components. For example, handset control server 140 may include a script translator 410, a database 420, an ASD controller 430, an event monitor 440, etc.

Script translator 410 may receive a script command(s) 400 from the ITP system, and may translate script command(s) 400 into information capable of being understood by ASDs 110. Script command(s) 400 may include commands for the creation of test cases for the SIP-based network, e.g., network 100. Script command(s) 400 may also define which physical devices of the SIP-based network may be used, and may assign names to the physical devices. For example, script command(s) 400 may include test commands such as "Off-Hook" (which may cause the hook-switch of SIP phone 340 to be activated, resulting in a dial tone), "Presskeys" (which may indicate a phone number, e.g., of one ASD 110, to dial), etc.

Script translator 410 may utilize database 420 to aid in the translation of script command(s) 400. In one implementation, database 420 may correspond to main memory 230, ROM 240, storage device 250, or combinations of the aforementioned (see FIG. 2). In another implementation, database 420 may be external to handset control server 140 and may be accessed via, e.g., communication interface 280. Database 420 may provide information enabling devices of the SIP-based system to reference specific IP address/port combinations for communication with specific ASDs 110 being used. Database 420 may also provide a reference to voice server 130 and/or a channel bank associated with a particular ASD.

ASD controller 430 may utilize the translated script command(s) to provide ASD information 450 to ASDs 110. For example, ASD controller 430 may map desired keystrokes to relays of relay interface 310 of ASD 110, and may repeat this function for each keystroke that needs to be activated (e.g., keystrokes for dialing a telephone number). In one example, to activate a single relay (e.g., "K3") of ASD 110 for "125" milliseconds (ms), ASD controller 430 may provide the following information:

```
Unsigned char array( )
Array(0) = 0x02;    // ASCII start of text
Array(1) = 0x31;    // unit address 1
Array(2) = 0x33;    // relay number K3
Array(3) = 0x95;    // Timed command to turn relay on for xxxxx ms.
Array(4) = 0x35;    // 5 ones - 5 ms
Array(5) = 0x32;    // 2 tens
Array(6) = 0x31;    // 1 hundreds
Array(7) = 0x30;    // 0 thousands
Array(8) = 0x30;    // 0 ten thousands
Array(9) = 0x0d;    // ASCII carriage return
Send array to microcontroller, Array(0) first.
```

Event monitor 440 may monitor for incoming event(s) 460 (e.g., a "Ring Detected" or ringing event) from ASDs 110, and may report event(s) 460 to the ITP system to enable interaction with the ITP scripting commands.

ASD controller 430 and/or event monitor 440 may permit handset control server 140 to communicate with ASDs 110 in a variety of ways. For example, in one implementation, handset control server 140 may include an Ethernet interface for communicating directly with ASDs 110. In another implementation, handset control server 140 may communicate directly with ASDs 110 using Transmission Control Protocol/Internet Protocol (TCP/IP). In still another implementation, handset control server 140 may communicate, via a terminal server, with ASDs 110 using TCP/IP. The terminal server may convert communications from TCP/IP into a serial interface (e.g., a "9600" baud rate serial interface). The terminal server may enable configuration of several serial devices and/or may enable TCP/IP communications with such devices via an IP address and a port number. Database 420 may map each ASD 110 to a TCP/IP address and port, which may enable handset control server 140 to communicate with several ASDs 110 by addressing ASDs 110 on the network (e.g., network 100).

Although FIG. 4 shows exemplary components of handset control server 140, in other implementations, handset control server 140 may contain fewer or additional components that may permit control and monitoring of ASDs 110. In still other implementations, one or more components of handset control server 140 may perform the tasks performed by other components of handset control server 140.

FIG. 5 depicts an exemplary network 500 in which systems and methods described herein may be implemented. As shown, network 500 may include an originating ASD (ASD/ORIG) 110 and a terminating ASD (ASD/TERM) 110 connected to multiple servers (e.g., SIP server 120, voice servers 130, and handset control server 140) via network 150. A first local area network (LAN) 510 may connect ASD/ORIG 110 to network 150 via a network device 530, and a second local area network (LAN) 520 may connect ASD/TERM 110 to network 150 via network device 530. LANs 510 and 520 may connect other devices (e.g., SIP phones 540, other ASDs 110, etc.) to network 150 via network devices 530.

Network devices 530 may include data transfer devices, such as gateways, routers, switches, firewalls, bridges, proxy servers, or some other type of device that processes and/or transfers data. In one implementation, network devices 530 may operate on data on behalf of a network, such as network 150. For example, network devices 530 may receive all, or substantially all, data destined for network 150 and/or transmitted by network 150.

ASD/ORIG 110 and ASD/TERM 110 may connect to handset control server 140 via terminal server 550. ASD/ORIG 110 and ASD/TERM 110 may connect to voice server 130 via channel bank 560. Handset control server 140 may communicate, via terminal server 550, with ASDs (ORIG and TERM) 110 using TCP/IP. Terminal server 550 may convert communications from TCP/IP into a serial interface (e.g., a "9600" baud rate serial interface). Terminal server 550 may enable configuration of several serial devices and/or may enable TCP/IP communications with such devices via an IP address and a port number.

Channel bank 560 may include a device that multiplexes a group of channels into a higher bit-rate digital channel and/or demultiplexes these aggregates back into individual channels. For example, channel bank 560 may change analog voice and data signals into a digital format. Channel bank 560 may be called a "bank" because it may convert a bank of a predetermined number (e.g., "24") of individual channels into a digital format, and then back to analog again. The predetermined number of channels may make up a "T1" circuit. In another implementation, channel bank 560 may multiplex a group of channels into a higher bandwidth analog channel. For example, channel bank 560 may convert voice signals from voice server 130 into analog signals. In still another implementation, channel bank 560 may enable adjustment of the transmit and receive levels of audio interfaces 320 of ASDs 110.

As further shown in FIG. 5, a voice path 570 may be provided in an exemplary test. The test shown in FIG. 5, for example, may originate a call from ASD/ORIG 110 (e.g., controller 300 of ASD/ORIG 110 may originate the call). The test call may be established, a tone may be sent by voice server 130 through ASD/ORIG 110, and the tone may be received by ASD/TERM 110 and verified by voice server 130. The devices and logic within network 500 may be configured to route a telephone number (e.g., "9727282583") to ASD/TERM 110. In FIG. 5, the ITP system may include ASD/ORIG 110, ASD/TERM 110, voice server 130 (upper left of FIG. 5), channel bank 560, terminal server 550, and handset control server 140. The remaining devices of FIG. 5 may constitute the SIP-based system being tested.

A script (e.g., script command(s) 400) may define the physical devices of network 500 to be used for conducting the test. For example, the script may define ASD/ORIG 110 as an originating ASD, and may define ASD/TERM 110 as a terminating ASD. A database within the ITP system (e.g., database 420) may enable the ITP system to reference specific IP address/port combinations to communicate with the specific ASDs being used. The database may also provide a reference to voice server 130 (upper left of FIG. 5) and channel bank 560.

ASD/ORIG 110 may be activated, and the ITP system (e.g., voice server 130 in cooperation with handset control server 140) may verify that SIP phone 340 of ASD/ORIG 110 is providing a dial tone via audio interface 320, and channel bank 560. The telephone number for ASD/TERM 110 may be entered on ASD/ORIG 110 (e.g., controller 300 may dial the telephone number on SIP phone 340 via relay interface 310). The ITP system (e.g., handset control server 140) may monitor ASD/TERM 110 for a ringing event. If a ringing event is detected, the ITP system (e.g., handset control server 140) may pause for a predetermined time (e.g., several seconds to simulate a ringing cycle in a real telephone) and may activate the hook-switch of ASD/TERM 110 (e.g., controller 300 may activate the hook-switch of relay interface 310 which may cause SIP phone 340 to receive the call) to answer the call.

The ITP system (e.g., voice server 130 in cooperation with handset control server 140) may cause a tone of a predetermined frequency (e.g., "1025" Hertz) to be generated on a particular T1 and channel associated with ASD/ORIG 110 (e.g., controller 300, via communications with voice server 130, may cause voice server 130 to generate the tone via channel bank 560 and audio interface 320). The ITP system (e.g., voice server 130 in cooperation with handset control server 140) may detect the presence of the tone via ASD/TERM 110 (e.g., controller 300, via communications with voice server 130, may cause voice server 130 to detect the tone via audio interface 320 and channel bank 560).

In one implementation, the tone may be generated using pulse code modulation (PCM) on a T1 interface of voice server 130 corresponding to ASD/ORIG 110. Channel bank 560 may convert the PCM tone into an analog tone, and may enable transmit and receive levels of the tone to be adjusted. The analog tone may be provided via audio interface 320 of ASD/ORIG 110. The tone received by audio interface 320 may be adjusted to a level that emulates the level received by a human voice driving a microphone. The tone may be received by SIP phone 340 of ASD/ORIG 110 in a manner similar to the manner a human voice is received by a handset of a SIP phone. A SIP phone, in normal operation, may provide SIP signaling to a network and may convert audio signals to Real Time Protocol (RTP) packets. In FIG. 5, after SIP signaling establishes the call, the tone may be transferred from ASD/ORIG 110 to ASD/TERM 110, via RTP packets, across network 150 (e.g., via LANs 510 and 520, and network devices 530). ASD/TERM 110 may receive the RTP packets and may convert the RTP packets into analog audio signals. ASD/TERM 110 may adjust the level of the audio signals (e.g., the tone) and may transmit the audio signals to speaker interface 321 of ASD/TERM 110. Speaker interface 321 of ASD/TERM 110 may transmit the audio signals to channel bank 560, and channel bank 560 may encode the audio signals as PCM. Channel bank 560 may send the encoded audio signals to voice server 130 (upper left of FIG. 5) where measurement and other testing functions may be performed.

In another implementation, ASD/TERM 110 may provide an adjustable tone to ASD/ORIG 110 in a manner similar to the manner ASD/ORIG 110 provides an adjustable tone to ASD/TERM 110, as described above. Voice server 130 (upper left of FIG. 5) may perform measurements and other testing functions on the tone generated by ASD/TERM 110.

Although FIG. 5 shows one test performed by the ITP system, in other implementations, additional or different tests may be performed by the ITP system. For example, the ITP system may be used to verify tones in both directions between ASD/ORIG 110 and ASD/TERM 110, and to provide perceptual speech quality measure (PSQM) voice quality testing of voice path 570. In another example, the ITP system may provide interfaces to a network (e.g., network 150) using protocols such as in-band, ISDN, and SS7. The ITP system may support testing from an ASD to or from such protocols. In still another example, the ITP system may support SIP testing directly from IP resources on an IP network. Rather than using an actual SIP phone, the ITP system may emulate SIP messaging and an RTP voice path. This may make it possible to create tests where the protocol may be non-conforming or corrupt. Such testing may help determine systems error trapping abilities. In a further example, ASDs 110 may originate and/or terminate SIP based calls directly to a SIP server (e.g., SIP server 120).

Although FIG. 5 shows exemplary components of network 500, in other implementations, network 500 may contain fewer or additional components that may permit network testing. In still other implementations, one or more components of network 500 may perform the tasks performed by other components of network 500.

FIG. 6 is a flowchart of an exemplary process 600 capable of being performed by ASD 110. As shown, process 600 may enable communications between an ASD and a SIP-based network for the purposes of testing the network (block 610). For example, in one implementation described above in connection with FIG. 3, controller 300 may enable communications for ASD 110 (e.g., via communication interface 350).

Process 600 may activate and/or deactivate relays based on the communications (block 620). For example, in one implementation described above in connection with FIG. 3, relay interface 310 of ASD 110 may be controlled by controller 300 and may be connected to a number keypad, function keys, a hook switch, and/or a power supply of SIP phone 340. Relay interface 310 may include a series of relays that may be activated and/or deactivated based on instructions received by, e.g., controller 300, may disconnect SIP phone 340 (i.e., take SIP phone 340 off the hook), may dial telephone numbers of varying lengths via SIP phone 340 (e.g., emulating human action), etc. In another example, relay interface 310 may control the power supplied to SIP phone 340 in order to reset SIP phone 340 and to cause SIP phone 340 to receive new configuration information.

As further shown in FIG. 6, process 600 may receive and/or transmit audio information (block 630). For example, in one implementation described above in connection with FIG. 3, audio interface 320 of ASD 110 may provide electrical conversion of information (e.g., audio information) received and/or transmitted by SIP phone 340. Audio interface 320 may include speaker interface 321 that receives audio information from SIP phone 340, and may further include transmitter 322 that converts the audio information from speaker interface 321 into electrical signals (e.g., representative of the audio information) and outputs the electrical signals. Audio interface 320 may include receiver 323 that receives electrical signals representative of audio information, and may further include microphone interface 324 that converts the electrical signals from receiver 323 and outputs audio information via SIP phone 340.

Process 600 may monitor a ringing event (block 640). For example, in one implementation described above in connection with FIG. 3, ring detector 330 of ASD 110 may monitor a ringing event for SIP phone 340. Ring detector 330 may connect to a speaker provided within SIP phone 340 or audio interface 320, and may monitor the audible ringing provided by the speaker of SIP phone 340 or audio interface 320 for a predetermined ring frequency. Ring detector 330 may permit adjustment of the predetermined ring frequency.

As further shown in FIG. 6, process 600 may provide notification if a ringing event occurs (block 650). For example, in one implementation described above in connection with FIG. 3, if a ringing event occurs for SIP phone 340, ring detector 330 may provide the information to controller 300 and controller 300 may notify devices external to ASD 110, via communication interface 350, of the ringing event.

FIG. 7 is a flowchart of an exemplary process 700 capable of being performed by handset control server 140. As shown, process 700 may translate script into ASD specific communications (block 710). For example, in one implementation described above in connection with FIG. 4, script translator 410 may receive a script command(s) 400 from the ITP system, and may translate script command(s) 400 into information capable of being understood by ASDs 110. Script command(s) 400 may include commands for the creation of test cases for the SIP-based network, e.g., network 100. Script command(s) 400 may also define which physical devices of the SIP-based network may be used, and may assign names to the physical devices. For example, script command(s) 400 may include test commands such as "OffHook" (which may cause the operation of the hook-switch of ASD 110, resulting in a dial tone), "Presskeys" (which may indicate a phone number, e.g., of one ASD 110, to dial), etc.

As further shown in FIG. 7, process 700 may map IP address and port locations of an ASD based on the translated script (block 720). For example, in one implementation described above in connection with FIG. 4, script translator 410 may utilize database 420 to aid in the translation of script command(s) 400. Database 420 may provide information enabling devices of the SIP-based system (e.g., handset control server 140) to reference specific IP address/port combinations for communication with specific ASDs 110 being used. Database 420 may also provide a reference to voice server 130 and/or a channel bank associated with voice server 130.

Process 700 may control an ASD(s) based on the mapped IP address and port locations and the script (block 730). For example, in one implementation described above in connection with FIG. 4, ASD controller 430 may utilize the translated script command(s) to provide ASD information 450 to ASDs 110. For example, ASD controller 430 may map desired keystrokes to relays of relay interface 310 of ASD 110, and may repeat this function for each keystroke that needs to be activated (e.g., keystrokes for dialing a telephone number).

As further shown in FIG. 7, process 700 may monitor an event(s) from an ASD(s) (block 740). For example, in one implementation described above in connection with FIG. 4, event monitor 440 may monitor for incoming event(s) 460 (e.g., a "Ring Detected" or ringing event) from ASDs 110, and may report event(s) 460 to the ITP system to enable interaction with the ITP scripting commands.

FIG. 8 is a flowchart of another exemplary process 800 capable of being performed by handset control server 140. As shown, process 800 may define originating and terminating ASDs (block 810). For example, in one implementation described above in connection with FIG. 5, a script (e.g., script command(s) 400) may define the physical devices of network 500 to be used for conducting the test. For example, the script may define ASD/ORIG 110 as an originating ASD, and may define ASD/TERM 110 as a terminating ASD.

As further shown in FIG. 8, process 800 may use a database to map IP address and port locations of the defined ASDs (block 820). For example, in one implementation described above in connection with FIG. 5, a database within the ITP system (e.g., database 420) may enable the ITP system to reference specific IP address/port combinations to communicate with the specific ASDs being used. The database may also provide a reference to voice server 130 (upper left of FIG. 5) and channel bank 560.

Process 800 may verify if the originating ASD is providing a dial tone (block 830). For example, in one implementation described above in connection with FIG. 5, ASD/ORIG 110 may be activated, and the ITP system (e.g., voice server 130 in cooperation with handset control server 140) may verify that SIP phone 340 of ASD/ORIG 110 is providing a dial tone via audio interface 320 and channel bank.

As further shown in FIG. 8, process 800 may instruct the originating ASD to dial a telephone number for the terminating ASD to initiate a call (block 840). For example, in one implementation described above in connection with FIG. 5, the telephone number for ASD/TERM 110 may be entered on ASD/ORIG 110 (e.g., controller 300 may dial the telephone number on SIP phone 340 via relay interface 310) to initiate a call.

Process 800 may monitor for a ringing event from the terminating ASD (block 850). For example, in one implementation described above in connection with FIG. 5, the ITP system (e.g., handset control server 140) may monitor ASD/TERM 110 for a ringing event.

As further shown in FIG. 8, process 800 may instruct the terminating ASD to answer the call (block 860). For example, in one implementation described above in connection with FIG. 5, if a ringing event is detected, the ITP system (e.g., handset control server 140) may pause for a predetermined time (e.g., to simulate a user delay in answering a call) and may activate the hook-switch of ASD/TERM 110 (e.g., controller 300 may activate the hook-switch of relay interface 310 which may cause SIP phone 340 to receive the call) to answer the call.

Process 800 may instruct a voice server to generate a tone associated with the originating ASD (block 870). For example, in one implementation described above in connection with FIG. 5, the ITP system (e.g., voice server 130 in cooperation with handset control server 140) may cause a tone of a predetermined frequency (e.g., "1025" Hertz) to be generated through ASD/ORIG 110. In one example, the tone may be generated, using PCM on voice server 130, through a portion of channel bank 560 corresponding to ASD/ORIG 110. Channel bank 560 may convert the PCM tone into an analog tone, and may enable transmit and receive levels of the tone to be adjusted. The analog tone may be provided via audio interface 320 of ASD/ORIG 110. The tone received by audio interface 320 may be adjusted to a level that emulates the level received by a human voice driving a microphone. After SIP signaling establishes the call, the tone may be transferred from ASD/ORIG 110 to ASD/TERM 110, via RTP packets, across network 150 (e.g., via LANs 510 and 520, and network devices 530).

As further shown in FIG. 8, process 800 may optionally instruct the voice server to generate a tone on a T1 channel associated with the terminating ASD to generate a tone (block 880). For example, in one implementation described above in connection with FIG. 5, voice server 130 in cooperation with handset control server 140 may provide an adjustable tone through channel bank 560 and ASD/TERM 110 to ASD/ORIG 110 in a manner similar to the manner ASD/ORIG 110 provides an adjustable tone to ASD/TERM 110.

Process 800 may verify the results of the generated tone(s) (block 890). For example, in one implementation described above in connection with FIG. 5, the ITP system (e.g., voice server 130 in cooperation with handset control server 140) may detect the presence of the tone with ASD/TERM 110. ASD/TERM 110 may receive the RTP packets and may convert the RTP packets into analog audio signals. ASD/TERM 110 may adjust the level of the audio signals (e.g., the tone) and may transmit the audio signals to speaker interface 321 of ASD/TERM 110. Speaker interface 321 of ASD/TERM 110 may transmit the audio signals to channel bank 560, and channel bank 560 may encode the audio signals as PCM. Channel bank 560 may send the encoded audio signals to voice server 130 (upper left of FIG. 5) where measurement and other testing functions may be performed. Voice server 130 (upper left of FIG. 5) may also perform measurements and other testing functions on the tone generated by ASD/TERM 110.

Systems and methods described herein may use an ASD that permits functional testing of a SIP-based network and/or devices within the SIP-based network with minimal manual input. The systems and methods may implement the ASD within an ITP system that may test the performance of the SIP-based network. The ITP system may include a handset control server that may provide specific control of the ASD and may enable ASD to be used in the larger ITP system.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 6-8, the order of the acts may differ in other implementations consistent with the embodiments described herein. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    monitoring, by a device, for an occurrence of a ringing event at an automated Session Initiation Protocol (SIP) device (ASD),
        the ringing event being associated with a call,
            the call occurring after communication is enabled between the ASD and a SIP-based network,
        the ASD transmitting a notification when the ringing event occurs;
    instructing, by the device and after the ASD has transmitted the notification, the ASD to answer the call;
    instructing, by the device and after the ASD has answered the call, a voice server to generate a tone associated with the ASD to test performance of the SIP-based network; and causing, by the device, the performance of the SIP-based network to be tested using the generated tone associated with the ASD.

2. The method of claim 1, further comprising:
activating or deactivating relays of the ASD based on:
the communication being enabled between the ASD and the SIP-based network, and
transmitting one or more instructions, to the ASD, relating to testing the performance of the SIP-based network.

3. The method of claim 2, where activating or deactivating the relays of the ASD comprises at least one of:
activating a hook-switch of the ASD to answer the call;
disconnecting a SIP phone of the ASD;
dialing telephone numbers of varying lengths via the SIP phone of the ASD;
pressing function keys to invoke a feature via the SIP phone of the ASD; or
controlling power supplied to the SIP phone of the ASD in order to reset the SIP phone and to cause the SIP phone to receive new configuration information.

4. The method of claim 1, further comprising:
monitoring the ASD for an occurrence of at least one of a call waiting event at the ASD or a message waiting indicator event at the ASD; and
receiving another notification, from the ASD, when the at least one of the call waiting event or the message waiting indicator event occurs.

5. The method of claim 4, where the message waiting indicator event includes a visible light, and
where monitoring for the occurrence of the at least one of the call waiting event or the message waiting indicator event comprises:
monitoring a light source of the visible light to determine whether the message waiting indicator event has occurred.

6. The method of claim 1, where monitoring for the occurrence of the ringing event comprises:
monitoring an audible ringing provided by a speaker of the ASD for a predetermined ring frequency.

7. A device comprising:
a processor to:
monitor an occurrence of a ringing event for a Session Initiation Protocol (SIP) phone associated with the device,
provide, to another device, a notification when the ringing event occurs,
receive, from the other device and based on providing the notification, an instruction to answer a call associated with the ringing event,
cause the SIP phone to answer the call, and
generate analog audio signals based on Real Time Protocol (RTP) packets associated with the call answered by the SIP phone; and
an audio interface to:
transmit the analog audio signals to test performance of a SIP-based network associated with the SIP phone.

8. The device of claim 7, where the device further comprises the SIP phone,
where the SIP phone provides SIP-based communications, and
where the SIP phone includes at least one of a keypad, function keys, a hook switch, a power supply, a speaker, or a microphone.

9. The device of claim 7, where the audio interface comprises:
a transmitter that receives the analog audio signals from the SIP phone, converts the analog audio signals into electrical signals representative of the analog audio signals, and outputs the electrical signals for testing;
a receiver that receives electrical signals representative of audio information; and
a microphone interface that converts the electrical signals, of the receiver, into audio information, and outputs the converted audio information via the SIP phone.

10. The device of claim 7, further comprising:
a relay interface including relays that are activated or deactivated based on instructions received, by the device, from the other device; and
a ring detector to monitor, with the processor, the occurrence of the ringing event for the SIP phone, and to provide the notification, to the other device, when the ringing event occurs.

11. The device of claim 10, where the relay interface, based on the instructions, at least one of:
controls a hook-switch;
dials telephone numbers of varying lengths via the SIP phone;
activates function keys; or
resets the SIP phone to permit the SIP phone to receive new configuration information.

12. The device of claim 10, where the ring detector:
connects to a speaker, provided within the SIP phone, or the audio interface, and
monitors an audible ringing provided by the speaker of the SIP phone, or the audio interface for a predetermined ring frequency.

13. A method comprising:
translating, by a server, a script command into a communication for a Session Initiation Protocol (SIP) device, the script command relating to testing a SIP-based network;
mapping, by the server, an Internet Protocol (IP) address and a port location of the SIP device based on the translated script command;
controlling, by the server, the SIP device based on:
the mapped IP address,
the mapped port location, and
the translated script command; and
monitoring, by the server, an event from the SIP device controlled based on:
the mapped IP address,
the mapped IP port location, and
the translated script command,
the script command including a particular script command that creates a test case for testing the SIP-based network.

14. The method of claim 13, where the event includes a ringing event.

15. The method of claim 13, where mapping the IP address and the port location comprises:
providing a memory that stores information enabling reference to a specific IP address and port combination, associated with each of a plurality of SIP devices, for communication with each of the plurality of devices, where the plurality of SIP devices include the SIP device; and
utilizing the memory when translating the script command.

16. A device comprising:
a script translator to translate a script command into a communication for a Session Initiation Protocol (SIP) device, the script command relating to testing a SIP-based network;

a memory to map an Internet Protocol (IP) address and a port location of the SIP device based on the translated script command; and a processor to:
control the SIP device based on:
the mapped IP address,
the mapped port location, and
the translated script command, and
monitor an event from the SIP device controlled based on:
the mapped IP address,
the mapped port location, and
the translated script command,
the script command including a script command that creates a test case to test the SIP-based network.

17. The device of claim 16, where the event includes a ringing event.

18. The device of claim 16, where the processor utilizes the translated script command to provide, to the SIP device, information that relates to testing the SIP-based network.

19. A method comprising:
defining, by a first server, an originating automated Session Initiation Protocol (SIP) device (ASD) and a terminating ASD;
utilizing, by the first server, a database to map an Internet Protocol (IP) address and a port location to the originating ASD and map an IP address and a port location to the terminating ASD;
verifying, by the first server, that the originating ASD is providing a dial tone;
instructing, by the first server and when the originating ASD is providing a dial tone, the originating ASD to dial a telephone number of the terminating ASD to initiate a call;
monitoring, by the first server, for a ringing event at the terminating ASD after instructing the originating ASD to dial the telephone of the terminating ASD;
instructing, by the first server, the terminating ASD to answer the call;
instructing, by the first server, a second server to generate a tone associated with the originating ASD to test performance of a SIP-based network,
the SIP-based network being associated with the originating ASD and the terminating ASD; and
causing, by the first server, the performance of the SIP-based network to be tested by causing a result of the generated tone to be verified.

20. The method of claim 19, further comprising:
instructing the second server to generate a return tone associated with the terminating ASD; and
verifying a result of the generated return tone.

21. The method of claim 20, further comprising:
causing one or more testing functions, of the SIP-based network, to be performed based on at least one of:
verifying the result of the generated tone, or
verifying the result of the generated return tone.

22. The method of claim 21, where causing the one or more testing functions, of the SIP-based network, to be performed includes:
performing a testing function associated with a voice quality associated with at least one of the generated tone or the generated return tone.

23. The method of claim 19, where the ringing event is associated with the call, and
where monitoring for the ringing event includes monitoring for the ringing event, associated with the call, at the terminating ASD.

* * * * *